US006950037B1

(12) United States Patent
Clavier et al.

(10) Patent No.: US 6,950,037 B1
(45) Date of Patent: Sep. 27, 2005

(54) SMART AIRPORT AUTOMATION SYSTEM

(75) Inventors: Odile H. Clavier, Los Altos, CA (US); David R. Schleicher, San Jose, CA (US); Sharon W. Houck, Portola Valley, CA (US); John A. Sorensen, Cupertino, CA (US); Paul C. Davis, Chiloquin, OR (US); Cornelius G. Hunter, Cameron Park, CA (US)

(73) Assignee: Sensis Corporation, Dewitt, NY (US)

( * ) Notice: Subject to any disclaimer, the term of this patent is extended or adjusted under 35 U.S.C. 154(b) by 0 days.

(21) Appl. No.: 10/431,163

(22) Filed: May 6, 2003

(51) Int. Cl.[7] ......................... G08B 21/00; G01S 13/00
(52) U.S. Cl. ...................... 340/945; 340/961; 340/971; 342/29; 342/36; 701/14
(58) Field of Search ........................ 340/945; 370/316; 465/431; 701/3, 10, 14; 342/36, 37

(56) References Cited

U.S. PATENT DOCUMENTS 5,111,400 A * 5/1992 Yoder ............................ 701/3
5,265,024 A * 11/1993 Crabill et al. ............... 701/200
6,262,679 B1 * 7/2001 Tran ............................ 342/29
6,380,869 B1 4/2002 Simon et al. ............... 340/961

OTHER PUBLICATIONS

"Implementing ADS-B in North Sea," published on Internet at http://www.aatl.net/publications/northsea.htm and downloaded Sep. 20, 2002.

* cited by examiner

*Primary Examiner*—Donnie L. Crosland
(74) *Attorney, Agent, or Firm*—Burr & Brown

(57) ABSTRACT

A smart airport automation system includes a subsystem that inputs weather and airport configuration data to determine an active runway in use and an airport state. Another subsystem inputs aircraft position and velocity data from available surveillance sources, known flight-intent information, and past aircraft trajectories to project future aircraft unconstrained trajectories. A third subsystem uses the projected trajectories and aircraft intent to determine desired landing and takeoff sequences, and desired adjacent aircraft spacing. A fourth subsystem uses such information to predict potential aircraft conflicts, such as a loss of acceptable separation between adjacent aircraft. A fifth subsystem packages the weather, airport configuration, aircraft state, desired landing/takeoff sequence, and potential conflict detection into a verbal advisory message that is broadcast on a local common radio frequency. A sixth subsystem uses the projected trajectory information to control the runway and taxiway lighting system.

4 Claims, 7 Drawing Sheets

Fig. 1

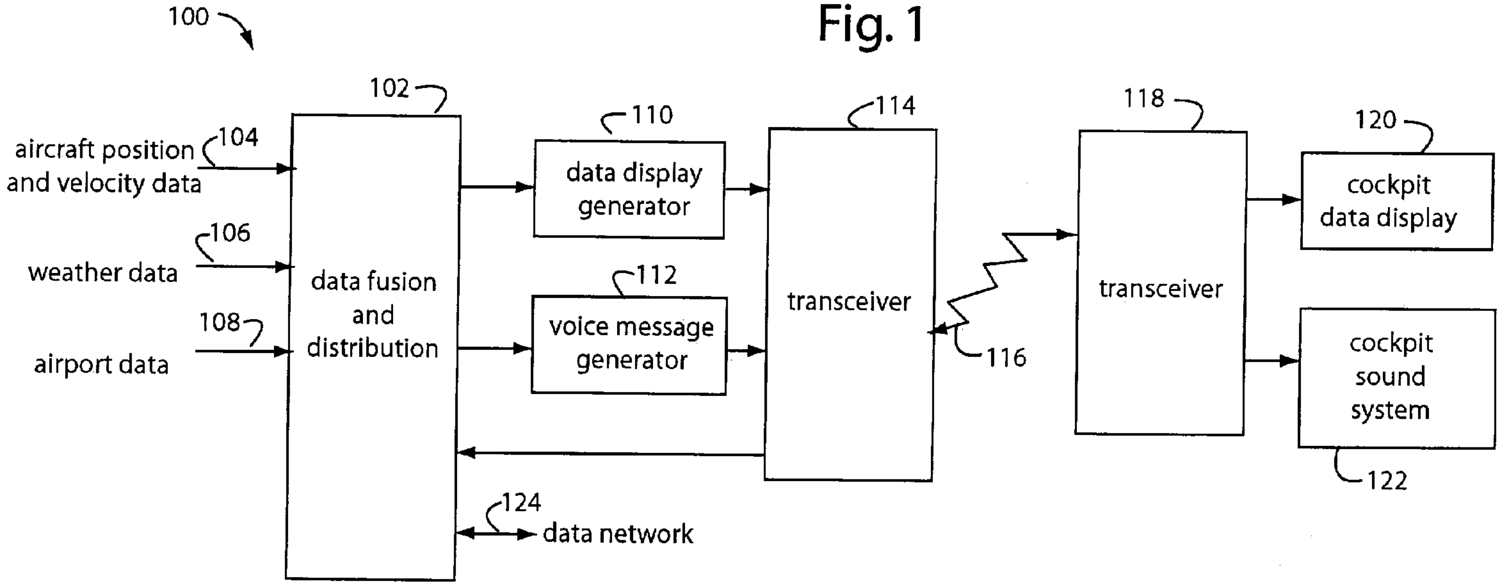

600

$$\begin{cases} x_1 = \cos(\psi_{ac}) \\ y_1 = \sin(\psi_{ac}) \end{cases}, \quad \begin{cases} x_2 = \cos(\psi_{leg}) \\ y_2 = \sin(\psi_{leg}) \end{cases}$$

$$den = x_1 y_2 - x_2 y_1$$

*Distance to fly before turn*

$$\begin{bmatrix} x \\ y \end{bmatrix} + a \begin{bmatrix} x_1 \\ y_1 \end{bmatrix} + b \begin{bmatrix} x_2 \\ y_2 \end{bmatrix} = \begin{bmatrix} x_w \\ y_w \end{bmatrix} \quad \text{(Vector equation)}$$

*Solve for:*

$$\begin{bmatrix} a \\ b \end{bmatrix} = \begin{bmatrix} x_1 & x_2 \\ y_1 & y_2 \end{bmatrix}^{-1} \begin{bmatrix} x_w - x \\ y_w - y \end{bmatrix}$$

$$\begin{cases} a = \dfrac{y_2(x_w - x) - x_2(y_w - y)}{(x_1 y_2 - x_2 y_1)} \\ b = \dfrac{x_1(y_w - y) - y_1(x_w - x)}{(x_1 y_2 - x_2 y_1)} \end{cases}$$

$$Distance\_perTimeStep = V_{ac} * TimeStep$$

*where*

$$V_{ac} = \sqrt{V_{x_{ac}}^{\,2} + V_{y_{ac}}^{\,2}}$$

$$Niterations = \frac{a}{Distance\_perTimeStep}$$

$$\begin{cases} x_{ac}(t + TimeStep) = x_{ac}(t) + V_{x_{ac}}(t) * TimeStep \\ y_{ac}(t + TimeStep) = y_{ac}(t) + V_{y_{ac}}(t) * TimeStep \end{cases}$$

$$\begin{cases} V_{x_{ac}}(t + TimeStep) = V_{x_{ac}}(t) + a_x(t) * TimeStep \\ V_{y_{ac}}(t + TimeStep) = V_{y_{ac}}(t) + a_y(t) * TimeStep \end{cases}$$

Fig. 6

Fig. 8

800

Total Turn

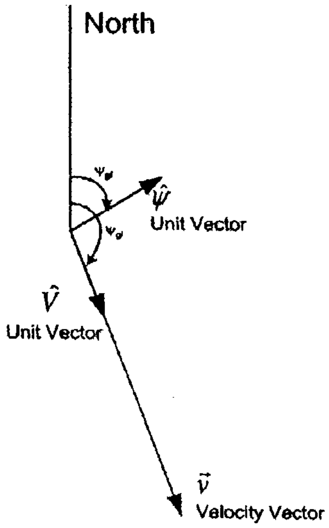

*A/C Turn radius*

$$ac\_TurnRadius = \frac{\sqrt{V_{x_{ac}}^{2} + V_{y_{ac}}^{2}}}{ac\_TurnRate}$$

*Calculate angle difference $\varphi$ between aicraft and pathway leg*

*Pathway leg groundtrack angle unit vector*

$$\hat{\psi}_{leg} = \left(\cos(\psi_{leg}), \sin(\psi_{leg})\right)$$

$$\hat{V} = \left(\frac{V_{x_{ac}}}{\sqrt{V_{x_{ac}}^{2} + V_{y_{ac}}^{2}}}, \frac{V_{y_{ac}}}{\sqrt{V_{x_{ac}}^{2} + V_{y_{ac}}^{2}}}\right)$$

$$\cos(\varphi) = \hat{V} \bullet \hat{\psi}_{leg} = \frac{V_{x_{ac}}}{\sqrt{V_{x_{ac}}^{2} + V_{y_{ac}}^{2}}}\cos(\psi_{leg}) + \frac{V_{y_{ac}}}{\sqrt{V_{x_{ac}}^{2} + V_{y_{ac}}^{2}}}\sin(\psi_{leg})$$

$$\sin(\varphi) = \left\|\hat{V} \times \hat{\psi}_{leg}\right\| = \frac{V_{x_{ac}}}{\sqrt{V_{x_{ac}}^{2} + V_{y_{ac}}^{2}}}\sin(\psi_{leg}) - \frac{V_{y_{ac}}}{\sqrt{V_{x_{ac}}^{2} + V_{y_{ac}}^{2}}}\cos(\psi_{leg})$$

*Use $\cos(\varphi)$ to calculate $\varphi$, then if $\sin(\varphi) < 0$, let $\varphi = -\varphi$*

*Then $TotalTurnAngle = \varphi$*

$$TurnAngle\_perTimeStep = sign(TotalTurnAngle) * ac\_turnrate * TimeStep$$

SMART AIRPORT AUTOMATION SYSTEM

FIELD OF THE INVENTION

The present invention relates to air traffic and flight operations control systems, and more particularly to automated systems that collect, organize, retransmit, and broadcast airport and aircraft advisory information collected from sensors and other data sources.

DESCRIPTION OF THE PRIOR ART

Large, busy airports often include a control tower and staffed with air traffic controllers. Some airports are so busy the air traffic control is maintained 24-hours a day, and seven days a week. But some control towers are closed at night. Other airports are so small, or used so infrequently, that there never was a control tower installed so there never are any air traffic controllers on-hand.

At a minimum, pilots flying in or out of airports need to know about other traffic in the area, runways to use, taxi instructions, weather, crosswind advisories, etc. When there is no control tower or staff, pilots must depend on their own sight and hearing, and then self-separate using the Common Traffic Airport Frequency (CTAF) radio channel.

Gary Simon, et al., describes an automated air-traffic advisory system and method in U. S. Pat. No. 6,380,869 B1, issued Apr. 30, 2002. Such system automatically provides weather and traffic advisories to pilots in an area. An airspace model constantly updates records for a computer processor that issues advisory messages based on hazard criteria, guidelines, airport procedures, etc. The computer processor is connected to a voice synthesizer that allows the pilot information to be verbally transmitted over the CTAF-channel.

Kim O'Neil for Advanced Aviation Technology, Ltd., wrote that there are significant opportunities to improve communication, navigation and surveillance services at Scatsta and in helicopter operations in the North Sea, including approaches to offshore installations. See, http://www.aatl.net/publications/northsea.htm. These improvements can allegedly lead to radical improvements in safety, efficiency and reductions in costs. A key element in achieving these improvements, according to O'Neil, is the full adoption of satellite navigation and data link services and in particular ADS-B. Various forms of VHF and other frequency data links make these improvements possible, and they provide major cost/benefits over existing costs and services. O'Neil says it is time to upgrade existing procedural services to a level more in line with modern aircraft operations. Current procedures, methods and operating practices are expensive, inefficient and adversely affect the commercial operation of air transportation services. Satellite navigation can significantly improve operating procedures, reduce decision heights at airports and improve routes and holding patterns. These all lead to corresponding gains in safety, efficiency and cost reduction. ADS-B messages also provide a communication infrastructure on which many other services can be built at low cost.

Additional services suggested by the prior art include Airline Operational Communications for aircraft operations efficiency, maintenance and engine performance for improving flight safety, Flight Watch, automated ATIS and related Meteorological services, differential GPS corrections and integrity data for improved navigation and flight safety, asset management, emergency and disaster management and coordination, remote monitoring and many other functions. The publication of RTCA MASPS and MOPS, ICAO SARPs, Eurocae MOPS and American and European Standards for data link and ADS-B, indicates that these technologies can be introduced and certified for many beneficial and cost/effective operational services.

SUMMARY OF THE INVENTION

Briefly, a smart airport automation system embodiment of the present invention gathers and reinterprets a wide variety of aircraft and airport related data and information around unattended or non-towered airports. Such is gathered from many different types of sources, and in otherwise incompatible data formats. It then decodes, assembles, fuses, and broadcasts structured information, in real-time, to aircraft pilots. Such information is also useful to remotely located air traffic controllers who monitor non-towered airport operations. The system includes a data fusion and distribution computer that inputs aircraft position and velocity, weather, and airport data. Such inputs ate used to compute safe takeoff and landing sequences, and other airport advisory information for participating aircraft. It determines whether the runway is occupied by another aircraft, and any potential in-flight loss of separation between aircraft. Such inputs are organized into useful information and packaged for graphical display and computer-synthesized voice messages. The data are then broadcast over a data link and the voice messages are broadcast through a local VHF transmitter to aircraft. Such is intended for use within at least a five-nautical mile radius of the airport. The pilots in the area receive voice annunciated VHF-broadcast signals and data links that carry text and pictures for an onboard display screen.

An advantage of the present invention is that a smart airport automation system is provided that enhances pilot situation awareness in airport terminal areas.

Another advantage of the present invention is that a smart airport automation system is provided that helps raise pilot awareness of aircraft in the air or on the runway and may thereby reduce runway incursions and mid-air conflicts.

A further advantage of the present invention is that a smart airport automation system provides efficiently fused information from disparate sources and then distributes this information in various formats to various users in order to increase safety and efficiency in the area around a non-towered airport.

Another advantage of the present invention is that it provides airport situational awareness to the surrounding air traffic management system for their monitoring of airports with or without radar surveillance.

These and other objects and advantages of the present invention will no doubt become obvious to those of ordinary skill in the art after having read the following detailed description of the preferred embodiments which are illustrated in the various figures.

IN THE DRAWINGS

FIG. 1 is a functional block diagram of a smart airport automation system embodiment of the present invention;

FIG. 6 is a set of mathematical equations useful in the capture pathway leg processing;

FIG. 8 lists some equations useful in a FlyTurn process subroutine called in the process illustrated in FIG. 7.

DETAILED DESCRIPTION OF THE PREFERRED EMBODIMENT

Figure 2:
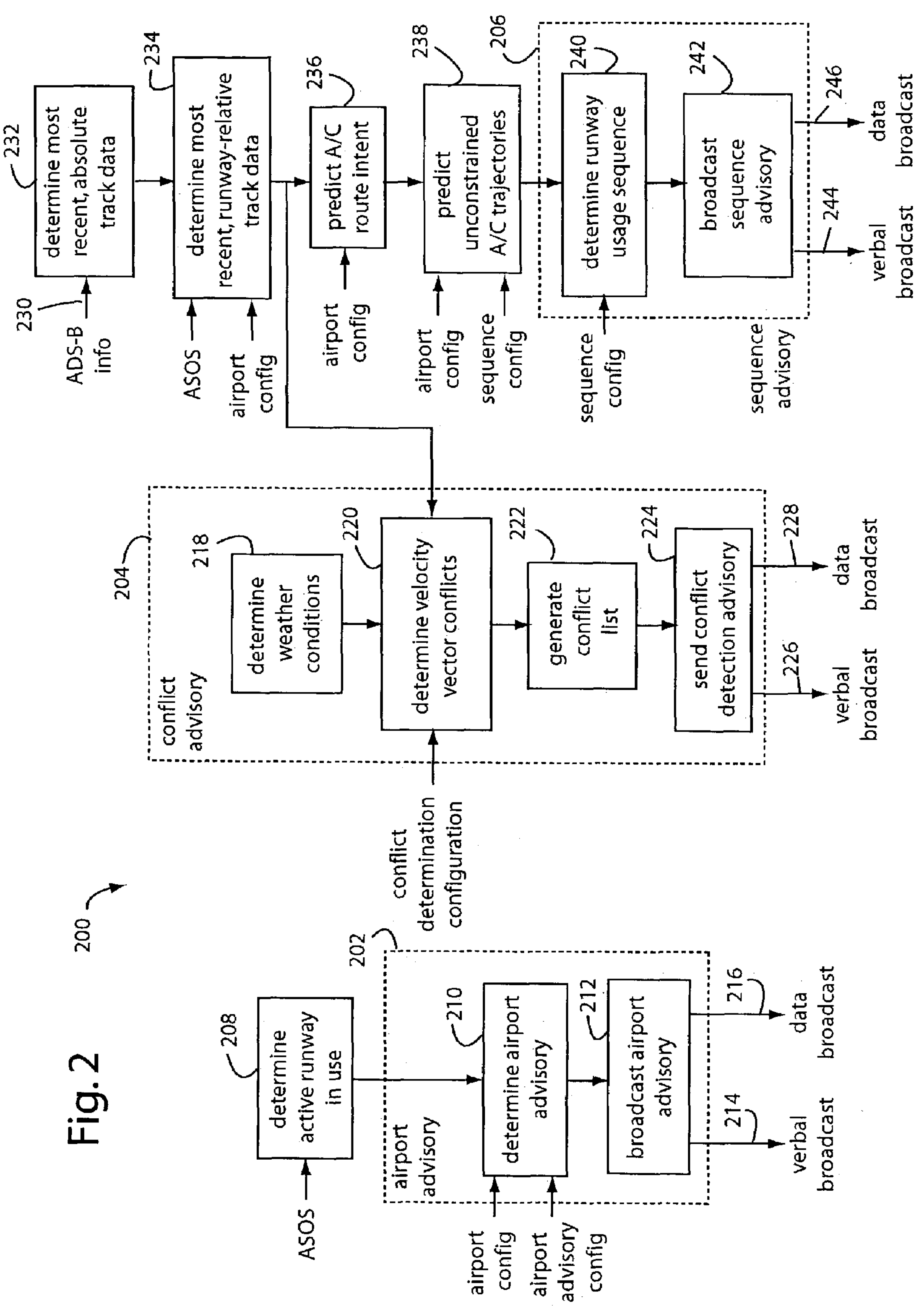
FIG. 2 is a functional block diagram of an advisory generator embodiment of the present invention that can be used in the system illustrated in FIG. 1.

FIG. 1 illustrates a smart airport automation system embodiment of the present invention, and is referred to herein by the general reference numeral 100. The system 100 gathers a wide variety of data and information from many different types of sources and in many different formats. It then interprets, fuses and structures information for use in real-time by pilots, e.g., especially those approaching or leaving non-towered airports. Such information is also useful to air traffic controllers overseeing non-towered airport operations.

A data fusion and distribution computer 102 is provided with aircraft-position-and-velocity data inputs 104, weather data inputs 106, and airport data inputs 108. These are processed into structured information, e.g., airport advisories, takeoff and landing sequences for participating aircraft, separation distance thresholds between sequential aircraft, separation monitoring, and conflict detection. Such processing outputs information organized and packaged for graphical display and computer-synthesized voice message broadcasts. The data fusion and distribution computer 102 computes and generates airport information, aircraft intending to land, aircraft intending to depart, landing sequence order, potential loss of separation, occupied runways, advisories, etc.

Data for display in the airplane cockpit for the pilots in the immediate area is constructed by a data display generator 110. Voice announcements for the pilots in the immediate area are composed by a voice message generator 112. These messages are broadcast through a local VHF transceiver 114 over a radio link 116 to the several on-board transceivers 118 in the immediate area. Such messages are intended for use by aircraft within at least a five-nautical mile radius of the airport. It can also be sent through networks to air traffic control, airport security, and other interested parties. Transceivers 118 output to a cockpit data display 120 and cockpit sound system 122.

Such information generated by the data fusion and distribution computer 102 is provided to a data network connection 124, e.g., via the Internet. Such would allow traffic controllers and other overseers to monitor remote unattended airports. The data network connection 124 may also be used to control special airport lighting systems, e.g., runway lights, taxi messages, warning lights, etc.

The aircraft position and velocity data inputs 104 can be synthesized from airport surveillance radar, onboard GPS-navigation receivers, and multi lateration transponder-based systems, etc. For example, some conventional aircraft include automated dependent surveillance broadcast (ADS-B) systems that broadcast GPS position and velocity information about the particular aircraft to other aircraft and ground stations. ADS-B reports provide identity, position, altitude, velocity, heading, and other information about an aircraft. A complete collection of such reports from a particular area can provide a very good current picture of airport traffic conditions. Other information sources include automated surface observatory system (ASOS), traffic information service broadcast (TIS-B), and flight information services broadcast (FIS-B) transmissions. Transponder-equipped aircraft signals can provide ground stations with enough data to compute the precise locations of the aircraft by multi-lateration.

The airport data 108 preferably includes airport name and identifier, active runway, airport visual flight rule patterns, airport instrument-approach pathways, prevailing weather, and other airport unique information. Information collection and fusion involves weather, active runway, aircraft in pattern, runway occupied/not. The information collected can also be used to activate specialized lighting.

The messages, displays, and text preferably received by the pilots in the approaching and leaving aircraft include (a) weather and other airport information, (b) sequencing information on how the particular aircraft should sequence to and from the runway relative to other aircraft, (c) traffic information related to potential loss of separation warnings, and (d) runway incursion information. Tables I–IV are examples of audio advisories spoken by cockpit sound system 122.

TABLE I

| |
|---|
| Airport Advisory: "Moffett Field, wind 320 at 10, active runway 32R, there are two aircraft within 5 miles of the airport" |

TABLE II

| |
|---|
| Sequence Advisory: "Aircraft 724 is #1. Aircraft 004 is #2 follow traffic on right downwind." |

TABLE III

| |
|---|
| Runway Advisory: "Runway is occupied by aircraft 724" |

TABLE IV

| |
|---|
| Traffic Advisory: "Warning! Warning! Aircraft 724 has traffic 1:00, 3 miles, 1,100 ft heading southeast. Aircraft 004 has traffic 11:00, 3 miles, 800 ft heading south." |

FIG. 2 illustrates a smart airport automation system advisory generator embodiment of the present invention, and is referred to herein by the general reference numeral 200. The advisory generator 200 comprises an airport advisory subsystem 202, a conflict advisory subsystem 204, and a sequence advisory subsystem 206. A process 208 uses weather and airport configuration data to determine the active runway in use. A process 210 inputs airport configuration data to determine an airport advisory message. A process 212 broadcasts an airport advisory via a verbal broadcast 214 and a data broadcast 216. A process 218 determines aircraft position and velocity state information and feeds this to a process 220 which determines potential aircraft conflicts, e.g., predicted reductions in safe separation distance. It inputs conflict determination configuration data, and generates a conflict list 222. A process 224 sends out a conflict detection advisory message via a verbal broadcast 226 and a data broadcast 228.

Any ADS-B information sent by aircraft so equipped is contributed to a process 232 for determining the most recent absolute track data of local air traffic. A process 234 determines the most recent runway relative track data from aircraft and airport configuration data inputs. A process 236 predicts aircraft route intentions and forwards these to a process 238 that predicts unconstrained aircraft trajectories. Airport configuration and sequence configuration data are used by process 238. The results are forwarded to a process 240 for determining runway usage sequences. A process 242 broadcasts runway sequence advisory messages via a verbal broadcast 244 and a data broadcast 246.

Figure 3:
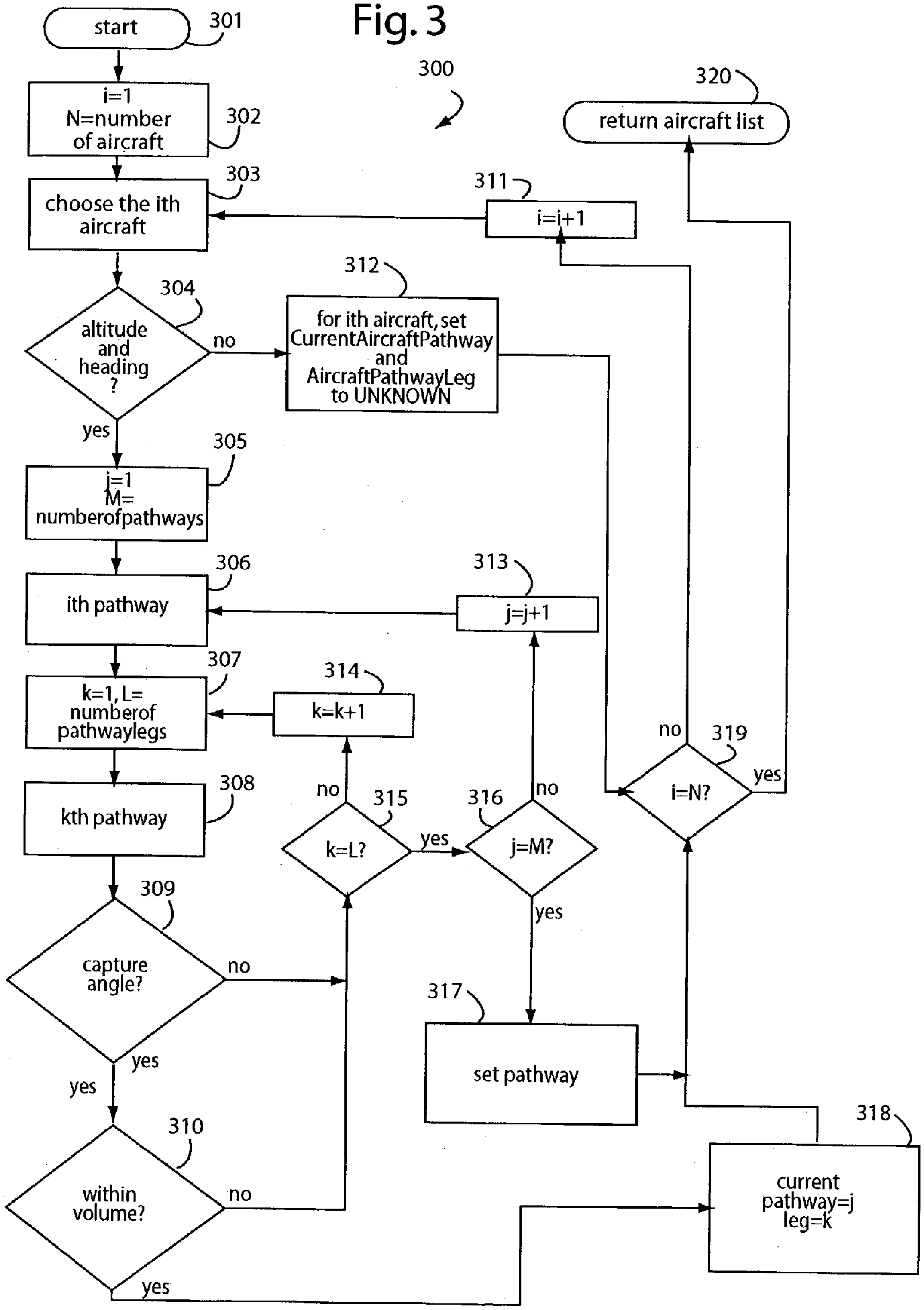
FIG. 3 is a flowchart of a process embodiment of the present invention for predicting an aircraft flight path.

FIG. 3 represents a process 300 for predicting the aircraft route intent. It starts with a step 301. A step 302 initializes the process with a first aircraft in a list. A step 303 chooses the next aircraft in the list to process. A step 304 checks the altitude and heading angle. If both are less that a preset maximum, a step 305 initializes a loop. A step 306 chooses a pathway. A step 307 sets the number of pathway legs. A step 308 chooses a pathway leg. A step 309 checks a capture angle. If less than a capture angle, a step 310 checks to see if the aircraft location is within the pathway leg coverage volume. A step 311 increments the main loop and returns to step 303. A step 312 sets the current aircraft pathway and leg to unknown if step 304 results in the maximums being exceeded. A step 313 increments a next inner loop and returns to step 306. A step 314 increments the innermost loop and returns to step 307. A test 315 checks to see if the innermost loop is finished. A test 316 checks to see if the next outer loop is also finished. If yes, a step 317 sets the current aircraft pathway and leg to unknown. A step 318 sets the current aircraft pathway to "j" and leg to "k". A test 319 sees if the outermost loop is finished, if so a step 320 returns with the aircraft ID, the aircraft pathway and leg selections.

Figure 4:
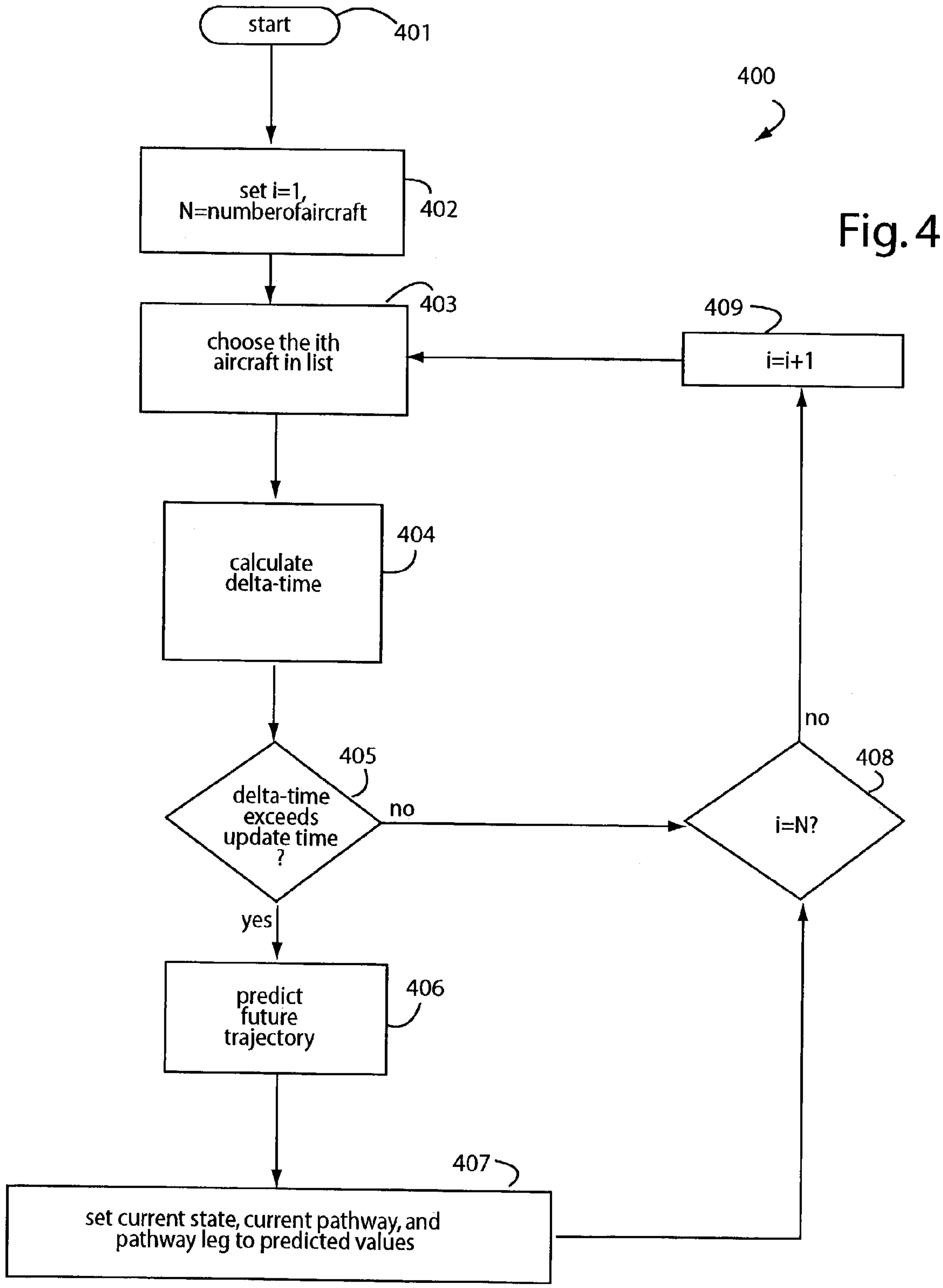
FIG. 4 is a flowchart of a process embodiment of the present invention for determining if data from an aircraft has become unavailable and therefore the smart airport must extrapolate the trajectory of that aircraft.

FIG. 4 represents a process 400 for determining that data for a particular aircraft has become unavailable and therefore the trajectory must be extrapolated. It determines when aircraft are sending outdated ADS-B messages and predicts their trajectories based on their last known status. It starts with a step 401. A step 402 initializes the process with a first aircraft in a list. A step 403 chooses the next aircraft to process in a program loop. A step 404 calculates the delta-time. A test 405 sees if the delta-time exceeds the sequence update time. If so, a step 406 predicts the future trajectory. A step 407 sets current state, current pathway and pathway leg to the predicted ones. A test 408 sees if the loop has finished. A step 409 increments the loop index.

Figure 5:
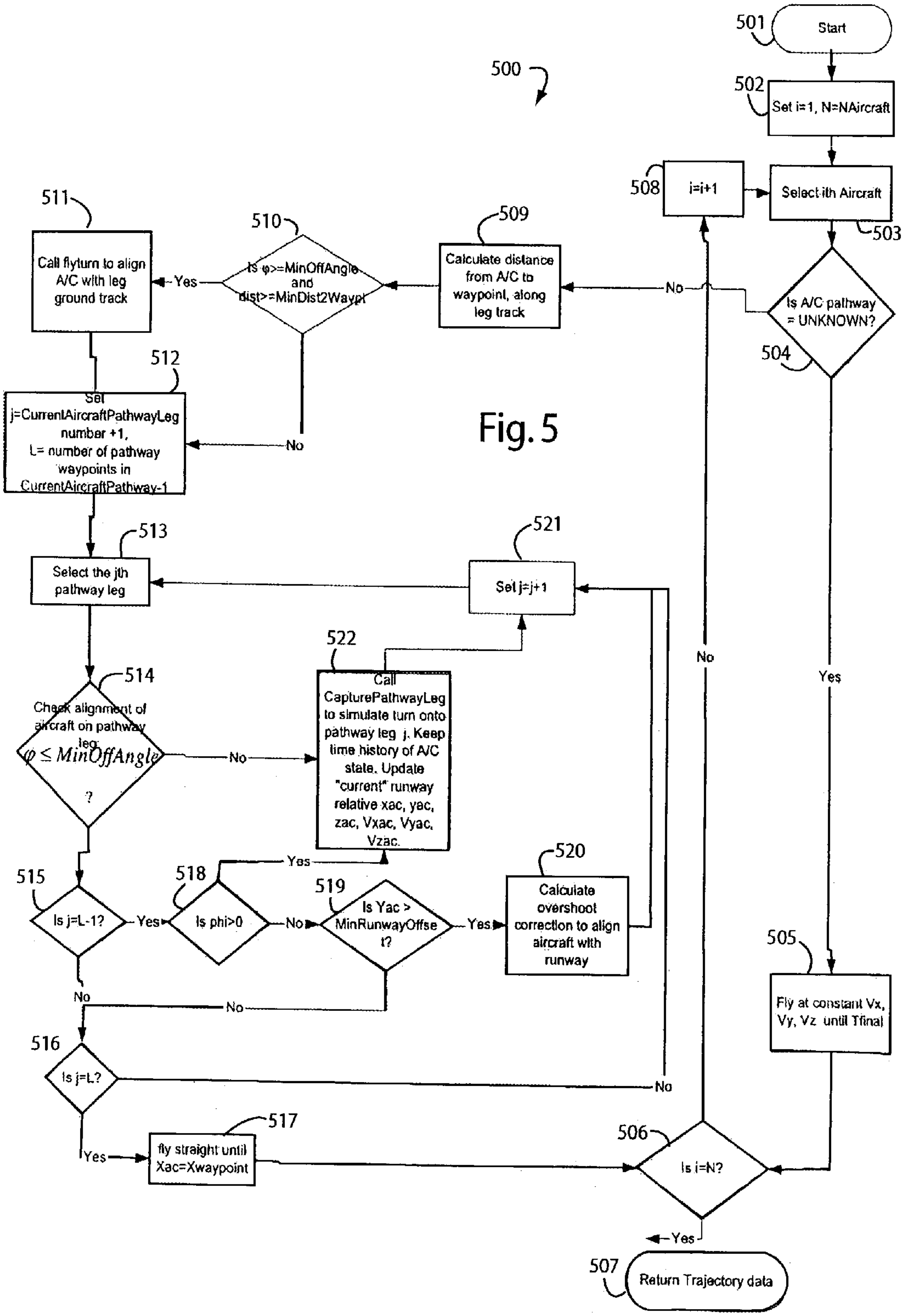
FIG. 5 is a flowchart of a process embodiment of the present invention for predicting unconstrained aircraft trajectories.

FIG. 5 represents a process 500 for predicting unconstrained aircraft trajectories. The process 500 determines whether an aircraft needs to turn to the pathway leg or fly straight to the next pathway leg. If the plane is not on an arrival or departure leg, and is on an UNKNOWN leg, the simulation assumes the plane will fly straight to some final approach pathway. The process 500 returns the trajectory data for each aircraft including a time history of the trajectory e.g., for each time step there is a new aircraft state, $x_{ac}$, $y_{ac}$, $z_{ac}$, $V_{xac}$, $V_{yac}$, $V_{zac}$. If the aircraft's ground track angle is already aligned with the current aircraft pathway leg, the simulation assumes it will capture the next pathway leg. If the aircraft is on the last leg, e.g., the runway, and its ground track angle is aligned with the runway ground track angle, it flies straight until it reaches the end of the runway ($X_{ac}=X_{runwaywaypoint}$). Process 500 starts with a step 501. A step 502 initializes the process with a first aircraft in a list. A step 503 chooses the next aircraft to process. A test 504 sees if the pathway is UNKNOWN. If so, a step 505 assumes a constant trajectory until Tfinal. A test 506 sees if the loop is finished. If so a step 507 returns the trajectory data. If not, a step 508 increments the loop counter. If test 504 returns a no, a step 509 calculates the distance from the aircraft to the waypoint along the leg track. A test 510 sees if the heading angle and distance exceed some minimums. If they do, a step 511 calls FlyTurn to align the aircraft with the leg ground track. A step 512 sets the pathway leg and waypoints. A step 513 selects the next pathway leg. A test 514 checks the alignment of the aircraft on the next pathway leg. A test 515 tests an inner loop index. A test 516 tests loop index j. If finished with the loop, a step 517 assumes straight flight to the next waypoint. A test 518 sees if the angle exceeds zero. If not, a test 519 looks for a minimum runway offset. If yes, a step 520 calculates the overshoot. A step 521 increments the j-loop counter. A step 522 calls a capture-pathway-leg process to simulate a turn onto pathway leg j. The distance to the waypoint along the track can be computed with, $d=\sqrt{(x_{ac}-x_w)+(y_{ac}-y_w)}$, dist2waypt=d*cos(ϕ), and +is the angle of aircraft leg track, and $(x_w, y_w)$ is the waypoint location.

FIG. 6 lists some capture pathway leg equations that are useful in the capture pathway leg process. In order to capture a pathway leg, a plane may need to fly a certain distance before initiating the turn. To calculate that distance, the process calculates the turn as if it was initiated right away to determine the geographic location of the point at the end of the turn. The straight distance to fly is then calculated as the distance between the end point of the turn to the intersection with the leg to be captured. The distance is calculated by using vector addition. First the unit vector for the straight leg is calculated simply using current ground track angle of the aircraft. A unit vector for the leg direction is calculated using leg ground track angle. A vector from the reference frame center to the leg waypoint is the sum of the vector from the center to the end point of the turn, the unit vector on straight leg multiplied by the straight distance a, and the unit vector on the leg multiplied by the distance to fly on the leg, a and b are the two constants to solve for.

Figure 7:
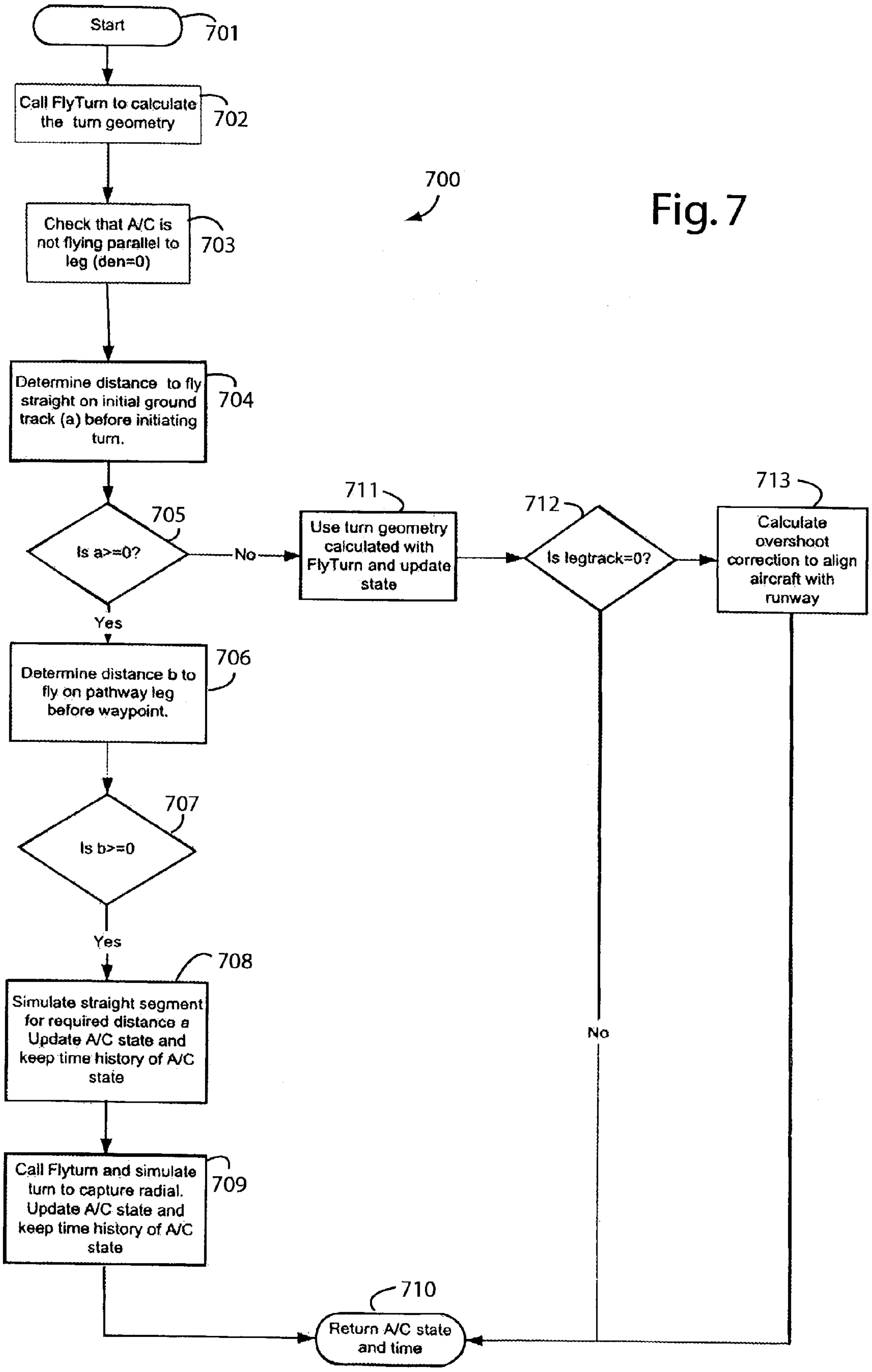
FIG. 7 is a flowchart of a process embodiment of the present invention for capturing a pathway leg.

FIG. 7 represents a process 700 for capturing a pathway leg. The process 700 starts with a step 701. A step 702 calls a FlyTurn subroutine to calculate the turn geometry. A step 703 checks to see that the aircraft is not flying parallel to the leg. A step 704 determines the distance to fly before turning. A test 705 tests for track "a" greater or equal to zero. If yes, a step 706 determines the distance "b". A test 707 sees if "b" is not negative. If not negative, then a step 708 simulates a straight segment and updates the aircraft state. A step 709 calls FlyTurn to capture radial. A step 710 returns the aircraft state and time. If test 705 was "no", then a step 711 uses the turn geometry calculated with FlyTurn and updates the state. A test 712 sees if legtrack=0. If so, a step 713 calculates the overshoot correction to align the aircraft with the runway.

FIG. 8 lists some equations useful in a FlyTurn process subroutine. The FlyTurn process simulates the aircraft in a turn. It assumes a constant turn rate defined in a sequencer configuration file. The simulation simulates incremental turns for each time step, and calculates the new state of the aircraft at each time step. The total number of iterations needed to simulate the whole turn may not be an exact integer number of time steps. Calculations must account for the turn made during the last fraction of a timestep.

An airport automation system embodiment of the present invention includes a set of data inputs for extracting aircraft and airport-related information local to an airport from a plurality of sources and in a plurality of different data formats. A processor is used for computing from the set of data inputs an airport advisory information, takeoff and landing sequences for participating aircraft, runway occupied status, separation monitoring, and conflict detection, and for providing unified nearby aircraft positions and velocities, weather, and airport structured information. A broadcasting system sends graphical display and voice messages to the cockpits of local aircraft from the processor. Such system can synthesize aircraft position and velocity data from at least one of airport surveillance radar, GPS-navigation receivers onboard local aircraft, multi-lateration, and other transponder-based systems. The data inputs typically include airport-unique information is gathered for broadcast, and includes at least one of airport name, airport identifier, active runway, airport visual flight rule patterns, and airport instrument-approach pathways. A connection, e.g., to the Internet, can be used for activating specialized airport runway lighting that is dependent on any information being broadcast.

A smart airport automation system advisory generator has a process that inputs weather and airport configuration data to determine the active runway in use, and a process that inputs airport configuration data to determine an airport advisory message, and that broadcasts an airport advisory via a verbal broadcast and a data broadcast. A conflict advisory subsystem determines aircraft position and velocity state information, and determines potential aircraft conflicts. It sends conflict detection advisory message broadcasts. A sequence advisory subsystem uses aircraft surveillance information in determining a most recent absolute track data of local air traffic, and predicts aircraft route intentions, unconstrained aircraft trajectories, and aircraft runway usage sequences, for broadcasting runway sequence advisory messages.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A smart airport automation system advisory generator, comprising:

an airport advisory subsystem that inputs weather and airport configuration data to determine the active runway in use, and the airport surface state regarding its utility for safe landing and takeoff operations;

an aircraft trajectory estimation system to project and predict each aircraft's future unconstrained trajectory (a) from position and velocity data extracted from aircraft surveillance sources, (b) known flight intent, (c) recent aircraft trajectory histories, and (d) stored local air traffic pattern data;

an aircraft takeoff and landing operations sequence determination system that uses projected unconstrained aircraft trajectories and takeoff and landing intentions to compute a desired runway takeoff and landing sequence among aircraft that are in an airport vicinity airspace that are preparing to land or are on the airport surface preparing to takeoff;

an aircraft conflict detection system providing for a conflict alert message regarding a projected unsafe condition determined from projected trajectories and intentions, and for computing desired separations within a sequence, and for predicting if (a) a loss of acceptable safe separation will occur, (b) any aircraft will get too close for wake vortex safety reasons, or (c) a landing will take place on a runway occupied by another aircraft;

an airport messaging system providing for digital and oral advisory messages that include airport weather, airport surface conditions, active runway, location and intent of aircraft on the airport surface or immediate surrounding airspace, assigned takeoff and landing sequence, and conflict alerts, and wherein, oral messages are broadcast to aircraft using voice synthesis technology and the common terminal advisory frequency (CTAF), and digital messages are sent on a data link to aircraft equipped to receive such a message; and an airport lighting control system that uses the current aircraft state, projected trajectory and intent information to turn on and off runway and taxiway lighting, as appropriate for safe night or low visibility operations.

2. A The smart airport automation system of claim 1, further comprising:

a processor for gathering and reinterpreting a wide variety of aircraft and airport related data and information around unattended or non-towered airports, wherein such is gathered from many different types of sources, and in otherwise incompatible data formats;

a processor for decoding, assembling, fusing, and voice broadcasting or digital data linking structured information, in real-time, to aircraft pilots; and a processor for structuring input information into an electronic signal form airport weather and operating conditions, projected aircraft trajectories and intents, desired takeoff and landing sequences, conflict alerts, broadcast advisory messages for participating aircraft, and airport lighting control signals.

3. The smart airport automation system of claim 2, further comprising:

a conflict-alert and airport-status safety processor including statistical trajectory predictors and intent information that matches its forecasts of probable turns, changes in altitude, and speed changes to determine if (a) a runway is projected to be occupied by another aircraft when an aircraft is proceeding to land, (b) two or more in-flight aircraft are projected to lose safe separation, (c) an aircraft is intending to use the wrong runway because of wind or unsafe surface conditions, or (d) an aircraft appears to intersect the ground at locations not consistent with runway location, and such that safety and status messages are generated to inform regional air traffic management authorities of unattended airport status.

4. The smart airport automation system of claim 2, further comprising:

a processor for organizing information for graphical display and for generating computer-synthesized voice and digital messages for their transmission to local aircraft.

* * * * *